(12) United States Patent
Wong et al.

(10) Patent No.: US 10,330,232 B2
(45) Date of Patent: Jun. 25, 2019

(54) DOMESTIC APPLIANCE SYSTEM WITH PUSH-FIT FLUID COUPLING

(71) Applicant: KONINKLIJKE PHILIPS N.V., Eindhoven (NL)

(72) Inventors: William Wai Lik Wong, Eindhoven (NL); Zhen Ming Jimmy Xing, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/076,538

(22) PCT Filed: Apr. 14, 2017

(86) PCT No.: PCT/EP2017/059068
§ 371 (c)(1),
(2) Date: Aug. 8, 2018

(87) PCT Pub. No.: WO2017/182410
PCT Pub. Date: Oct. 26, 2017

(65) Prior Publication Data
US 2019/0040987 A1 Feb. 7, 2019

(30) Foreign Application Priority Data
Apr. 18, 2016 (EP) ..................................... 16165790

(51) Int. Cl.
*F16L 37/32* (2006.01)
*D06F 75/14* (2006.01)
(Continued)

(52) U.S. Cl.
CPC .............. *F16L 37/32* (2013.01); *D06F 75/14* (2013.01); *D06F 79/02* (2013.01); *F16L 21/03* (2013.01); *F16L 29/02* (2013.01); *F16L 37/025* (2013.01)

(58) Field of Classification Search
CPC ......... F16L 37/08; F16L 37/32; F16L 37/025; F16L 29/00; F16L 29/02; F16L 29/04;
(Continued)

(56) References Cited

U.S. PATENT DOCUMENTS

| 2,905,487 A | 9/1959 | Schifter |
| 4,190,075 A | 2/1980 | Kayser |

(Continued)

FOREIGN PATENT DOCUMENTS

| JP | 04073099 A | * | 3/1992 |
| JP | 2715630 B2 | | 2/1998 |

(Continued)

*Primary Examiner* — Ismael Izaguirre (57) ABSTRACT

The invention relates to domestics appliance system which makes use of a push-fit fluid coupling (1) comprising a fluid feeding portion (2) and a fluid receiving portion (3) adapted to cooperate with each other to enable fluid to flow in a downstream direction (D1) from the fluid feeding portion (2) to the fluid receiving portion (3). The fluid receiving portion (3) comprises an actuator (65) comprising a fluid conduit (67) for fluid to flow from the fluid feeding portion (2) to the fluid receiving portion (3). The fluid feeding portion (2) comprises a housing (4) defining a fluid flow path (5) and comprising an opening (6) in which the actuator (65) is intended to be inserted, a chamber (37) arranged in the housing (4) in which fluid is intended to flow, a valve seat (8) and a valve member (7) engaging the valve seat (8) for closing the fluid flow path (5), a first piston (9) slidably received in the chamber (37) downstream of the valve member (7). The fluid feeding portion (2) and the fluid receiving portion (3) are adapted to cooperate with each other such that when the actuator (65) is inserted in the opening (6), the actuator (65) and the opening (6) cooperate with each other to form a fluid seal preventing fluid in chamber (37) to leak out from the chamber (37), then, when the actuator (65) is further inserted in the opening (6), the actuator (65) is adapted to contact the first piston (9) and to displace the first piston (9) in an upstream direction (D2) until the first piston (9) contacts the valve member (7) and lifts the valve member (7) off the valve seat (8) for opening the fluid flow path (5) and allowing fluid to flow in the (Continued)

downstream direction (D1). This invention prevents leak of fluid between the fluid feeding portion (2) and the fluid receiving portion (3).

16 Claims, 5 Drawing Sheets

(51) Int. Cl.
*D06F 79/02* (2006.01)
*F16L 21/03* (2006.01)
*F16L 29/02* (2006.01)
*F16L 37/02* (2006.01)

(58) Field of Classification Search
CPC ........ F16L 21/03; D06F 75/12; D06F 79/026; D06F 75/14; E21B 17/02; F16K 15/02; F16K 15/021; F16K 15/025; F16K 15/026; Y10T 137/6148; Y10T 137/88062
See application file for complete search history.

(56) References Cited

U.S. PATENT DOCUMENTS

| | | | | |
|---|---|---|---|---|
| 5,315,773 | A * | 5/1994 | Iwami | D06F 75/12 219/247 |
| 5,402,826 | A * | 4/1995 | Molnar | B05B 5/1616 137/614.01 |
| 6,024,124 | A | 2/2000 | Braun | |
| 6,085,785 | A * | 7/2000 | Smith, III | E21B 33/038 137/614 |
| 6,176,026 | B1 | 1/2001 | Leung | |
| 6,622,404 | B2 * | 9/2003 | Valiyambath | D06F 75/02 38/77.8 |
| 8,347,916 | B2 | 1/2013 | June | |
| 8,899,256 | B2 * | 12/2014 | Krohn | F16L 37/34 137/15.18 |

FOREIGN PATENT DOCUMENTS

RU           2094689 C1    10/1997
WO       2015052633 A1    4/2015

* cited by examiner

DOMESTIC APPLIANCE SYSTEM WITH PUSH-FIT FLUID COUPLING

This application is the U.S. National Phase application under 35 U.S.C. § 371 of International Application No. PCT/EP2017/059068, filed on Apr. 14, 2017, which claims the benefit of International Application No. 16165790.3 filed on Apr. 18, 2016. These applications are hereby incorporated by reference herein.

FIELD OF THE INVENTION

The present invention relates to domestic appliance systems, in which a docking station comprises a water supply and a domestic appliance is mountable on the docking station. It relates to a push-fit fluid coupling to enable water to flow from the water supply into the domestic appliance when the domestic appliance is mounted on the docking station.

The present invention has for example some applications in the field of garment care appliances.

BACKGROUND OF THE INVENTION

It is known to provide a push-fit fluid coupling for the purpose of managing the transfer of fluid, such as water, between two separable components, such as a cordless steam iron and a docking station.

When the cordless steam iron is docked, a fluid flow path is formed between the docking station and the steam iron to allow fluid to flow into the steam iron.

When the steam iron is lifted off the docking station, the fluid coupling closes to block the fluid flow path and to prevent leakage.

Those known solutions are not capable of withstanding multiple and frequent docking/undocking cycles with fluid pressure, while efficiently preventing leak of fluid at the coupling level. As well, those known solutions are not suitable for placement in multiple orientations of the coupling.

SUMMARY OF THE INVENTION

It is an object of the invention to provide a domestic appliance system, which uses a push-fit fluid coupling which substantially alleviates or overcomes one or more of the problems mentioned above.

The invention is defined by the independent claims. The dependent claims define advantageous embodiments.

According to the present invention, there is provided a system comprising:
  a docking station comprising a water supply,
  a domestic appliance mountable on the docking station, and
  a push-fit fluid coupling to enable water to flow from the water supply into the domestic appliance when the domestic appliance is mounted on the docking station (86), wherein the push-fit fluid coupling comprising a fluid feeding portion and a fluid receiving portion adapted to cooperate with each other to enable fluid to flow in a downstream direction from the fluid feeding portion to the fluid receiving portion. The fluid receiving portion comprises an actuator comprising a fluid conduit for fluid to flow from the fluid feeding portion to the fluid receiving portion. The fluid feeding portion comprises a housing defining a fluid flow path and comprising an opening in which the actuator is intended to be inserted, a chamber arranged in the housing in which fluid is intended to flow, a valve seat and a valve member engaging the valve seat for closing the fluid flow path, a first piston slidably received in the chamber downstream of the valve member. The fluid feeding portion and the fluid receiving portion are adapted to cooperate with each other such that:

a) when the actuator is inserted in the opening, the actuator and the opening cooperate with each other to form a fluid seal preventing fluid in chamber to leak out from the chamber, then
  b) when the actuator is further inserted in the opening, the actuator is adapted to contact the first piston and to displace the first piston in an upstream direction until the first piston contacts the valve member and lifts the valve member off the valve seat for opening the fluid flow path and allowing fluid to flow in the downstream direction.

This solution allows an efficient seal between the fluid receiving portion and the fluid feeding portion prior to opening of the valve member and the potential for leakage is reduced.

By providing the water supply in the docking station, the weight and size of the domestic appliance can be reduced and the fluid coupling can quickly and effectively transfer water from the water supply into the domestic appliance when the domestic appliance is docked on the docking station.

Preferably, the fluid feeding portion is arranged in the docking station and the fluid receiving portion may be arranged in the domestic appliance.

In the push-fit coupling design, as the valve member closes the fluid flow path before the fluid feeding portion is fully withdrawn from the fluid feeding portion, leakage of fluid is also reduced during de-coupling, as the water in the fluid feeding portion downstream of the valve member is not under pressure when the valve member is closed against the valve seat. Fluid can therefore be transferred from a source to its intended destination, which may be a portable appliance, with minimal or no leakage of fluid.

Preferably, the push-fit fluid coupling further comprises a first spring element cooperating with the first piston so as to retain the first piston in a downstream position in which the first piston closes the opening when the actuator is not inserted into the opening.

This prevents that fluid in the chamber does not leak out this chamber when the fluid feeding portion and the fluid receiving portion are not coupled with each other. This also allows arranging the fluid feeding portion in whatever positions (horizontal, vertical, inclined . . . ) without any leak of fluid when the fluid feeding portion and the fluid receiving portion are not coupled with each other.

Advantageously, the first spring element is a coil spring. This type of spring allows an easy mounting on the first piston.

Advantageously, the push-fit fluid coupling comprises a second spring element acting on the valve member to retain the valve member in engagement with the valve seat for closing the fluid flow path.

Therefore, the valve member is urged downstream against the valve seat by the second spring element to ensure the fluid flow path is closed when the fluid receiving portion is not (fully) inserted into the fluid feeding portion. This enables an effective seal to be achieved between the fluid feeding portion and the fluid receiving portion prior to initiation of fluid flow. The more effective seal allows the push-fit fluid coupling to deal with shocks and pressure generated by the fluid flow without leakage.

In preferred embodiments, the first piston is spaced from the valve member when the first piston is retained in a position in which the first piston closes the opening so that the first piston is displaced in an upstream direction towards the valve member for a given distance prior to making contact with the valve member.

Therefore, during coupling of the push-fit coupling, the opening is always first opened before the valve member is unseated. This means that a more complete physical connection can be obtained before fluid can flow along the fluid flow path. This helps to reduce the leakage of fluid. Furthermore, the valve member is always re-seated before the opening is closed during uncoupling. Therefore, fluid pressure cannot be transferred downstream during uncoupling which also helps to prevent fluid leaking out of the push-fit fluid coupling.

Advantageously, the push-fit fluid coupling may comprise a sealing member extending about the opening to form a fluid seal between the actuator and the opening.

Therefore, during insertion and removal of the fluid receiving portion from the fluid feeding portion fluid is prevented from leaking out of the opening.

Preferably, the first piston and the valve member are both maintained in a downstream position when the actuator is not inserted into the opening.

This configuration allows that the fluid pressure flowing in the flow path further maintain the valve member seated against the valve seat, and the first piston sealing the opening, which further prevent fluid leak.

In one embodiment, the fluid receiving portion may comprise a housing, a fluid flow path extending through the housing, a second piston slidably received in the fluid flow path and retained in a position in which the second piston closes the fluid flow path in the absence of a flow of fluid in a downstream direction along the fluid conduit.

Therefore, fluid in the fluid receiving portion cannot exit the fluid flow path by flowing back along the fluid conduit. Furthermore, the piston will seal off the fluid flow path due to a lack of fluid pressure when the valve member is seated on the valve seat.

Advantageously, the second piston may comprise a seal to form a fluid seal between the piston and the housing to close the fluid flow path.

When then piston seals the fluid receiving portion, no more fluid flows from the fluid feeding portion to the fluid receiving portion. The removal of the actuator creates a negative pressure in the fluid feeding portion so that fluid is drawn out of the fluid conduit as the fluid receiving portion and fluid feeding portions are in the process of being separated. Other than the fluid in the fluid conduit, the seal prevents fluid from leaking out of the fluid receiving portion. The piston closes one end of the fluid conduit so that any water remaining in the fluid conduit will remain trapped inside the conduit by external atmospheric pressure without leaking out. This prevents any remaining fluid in the fluid conduit from dripping out when the fluid receiving portion is not coupled to the fluid feeding portion.

In one embodiment, the actuator may extend from a surface of the fluid receiving portion and the opening may be formed in a surface of the fluid feeding portion. The surface of the fluid receiving portion and the surface of the fluid feeding portion may be adapted to contact with each other when the actuator is inserted into the opening (fully, or partially).

Preferably, an end surface of the actuator may comprise a channel for fluid to flow from the fluid flow path into the fluid conduit.

The channel allows fluid to pass from the fluid feeding portion to the fluid receiving portion whilst the actuator urges the first piston in an upstream direction.

In another embodiment, the actuator may comprise a passage in fluid communication with the fluid conduit and extending outwardly from the fluid conduit for fluid to flow from the fluid flow path into the fluid conduit.

The passage allows fluid to pass from the fluid feeding portion to the fluid receiving portion whilst the actuator urges the first piston in an upstream direction.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
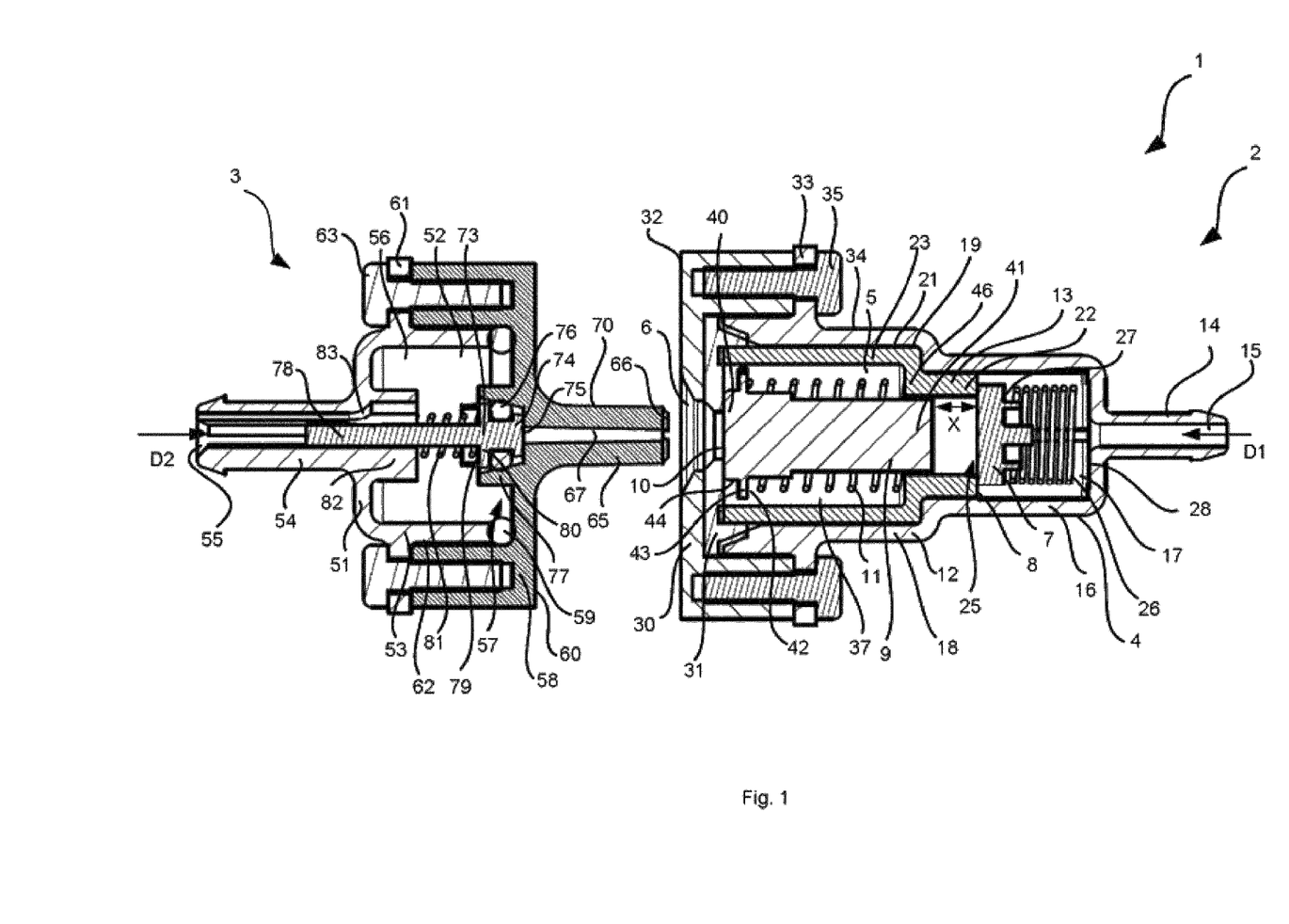
FIG. 1 shows a push-fit fluid coupling for use in a domestic appliance system according to an embodiment of the invention, prior to insertion of the fluid receiving portion into the fluid feeding portion.

Referring to FIG. 1, there is shown a push-fit fluid coupling 1 comprising a fluid feeding portion 2 and a fluid receiving portion 3 adapted to cooperate with each other to enable fluid to flow in a downstream direction D1 from the fluid feeding portion 2 to the fluid receiving portion 3.

The fluid receiving portion 3 comprises an actuator 65 comprising a fluid conduit 67 for fluid to flow from the fluid feeding portion 2 to the fluid receiving portion 3.

The fluid feeding portion 2 comprises:
a housing 4 defining a fluid flow path 5 and comprising an opening 6 in which the actuator 65 is intended to be inserted,
a chamber 37 arranged in the housing 4 in which fluid is intended to flow,
a valve seat 8 and a valve member 7 engaging the valve seat 8 for closing the fluid flow path 5,
a first piston 9 slidably received in the chamber 37 downstream of the valve member 7.

The fluid feeding portion 2 and the fluid receiving portion 3 are adapted to cooperate with each other such that:
a) when the actuator 65 is inserted in the opening 6, the actuator 65 and the opening 6 cooperate with each other to form a fluid seal preventing fluid in chamber 37 to leak out from the chamber 37, then, b) when the actuator 65 is further inserted in the opening 6, the actuator 65 is adapted to contact the first piston 9 and to displace the first piston 9 in an upstream direction D2 until the first piston 9 contacts the valve member 7 and lifts the valve member 7 off the valve seat 8 for opening the fluid flow path 5 and allowing fluid to flow in the downstream direction D1.

Preferably, the push-fit fluid coupling 1 further comprises a first spring element 11 cooperating with the first piston 9 so as to retain the first piston 9 in a downstream position in which the first piston 9 closes the opening 6 when the actuator 65 is not inserted into the opening 6.

Preferably, the first spring element 11 is a coil spring.

The fluid receiving portion 3 is adapted, when inserted into the opening 6, to contact the first piston 9 and to displace the first piston 9 in an upstream direction D2 until the first piston 9 contacts the valve member 7 and lifts the valve member 7 off the valve seat 8 for opening the first fluid flow path 5 and thereby allowing fluid to flow in said downstream direction D1.

FIG. 1 shows the push-fit fluid coupling 1 prior to insertion of the fluid receiving portion 3 into the fluid feeding portion 2. Therefore, the fluid receiving portion 3 has not been inserted into the opening 6 and has not made contact with an end surface 10 of the piston 9, so that no displacement of the piston 9 has occurred.

In one embodiment, the fluid feeding portion 2 may comprise an outer housing 12 and an inner housing 13. The outer housing 12 and inner housing 13 may be generally cylindrical in shape.

In the embodiment shown in FIG. 1, the outer housing 12 may comprise three sections.

A first upstream section 14 may comprise an inlet 15 configured to be fluidly connected to a fluid source, such as a water supply (not shown).

A second section 16 being downstream of the inlet 15 and comprising a first chamber 17 forming part of the first fluid flow path 5 and which is configured to hold fluid when the valve member 7 is seated in its valve seat 8. The diameter of the first chamber 17 is preferably larger than that of the inlet 15.

A third section 18 downstream of the second section 16 having a preferably larger diameter than that of the second section 16. The end of the third section 18 which is distal to the inlet 15 is open. It will be understood that in an alternative embodiment, the relative dimensions and proportions of each of the sections may vary.

The inner housing 13 is open at both ends and is located inside the outer housing 12. An inner surface 19 of the outer housing 12 may lie in contact with an outer surface 21 of the inner housing 13. The inner housing 13 may comprise a first section 22 and a second section 23 downstream of the first section 22. The first section 22 of the inner housing 13 may extend between the second and third sections 16, 18 of the outer housing 12. The second section 23 of the inner housing 13 preferably has a larger diameter than that of the first section 22. It will be understood that in alternative embodiments, the relative dimensions may vary.

In the present embodiment, the first section 22 of the inner housing 13 extends partially into the second section 16 of the outer housing 12 to form a step so that the cross-sectional area of the first flow path 5 reduces in the second section 16 of the first housing 4. The surface at the extremity of the first section 22 forms the valve seat 8. Therefore, the first chamber 17 is defined between the inlet 15 and the valve seat 8. It will be understood that in an alternative embodiment, the outer and inner housings 12, 13 may be integrally formed.

The valve member 7 may be retained in a downstream position. That is, the valve member 7 is located against the valve seat 8 by being urged in the downstream direction D1. The valve member 7 may have a diameter which is larger than the diameter of an open end 25 of the inner housing 13 so that the valve member 7 fluidly seals the first chamber 17 from the rest of the first housing 4 downstream of the valve seat 8 when the valve member 7 is in its downstream position against the valve seat 8. However, the diameter of the valve member 7 may also be smaller than the diameter of the second section 16 of the outer housing 12.

The valve member 7 may be held in its downstream position by the pressure of fluid in the first chamber 17 that acts against the valve member 7 to press the valve member 7 against the valve seat 8. However, the valve member 7 may be further urged into its downstream position in which the valve member 7 is located against the valve seat 8 and covers the open end 25 by a second spring element 26. The second spring element 26 acts to retain the valve member 7 in engagement with the valve seat 8 until the valve member is lifted off the valve seat 8 by the first piston 9. The second spring element 26 is disposed in the first chamber 17 and is located between a rear surface 27 of the valve member 7 and an upstream wall 28 of the first housing 4 to urge the valve member 7 in the downstream direction D1 against the valve seat 8.

The first housing 4 of the fluid feeding portion 2 may further comprise a first cap 30 which extends around the open end of the outer housing 12 and a sealing member 31 arranged in the opening 6 to form a fluid seal between the fluid feeding portion 2 and the fluid receiving portion 3 when the fluid receiving portion 3 is inserted into the opening 6 in the fluid feeding portion 2. Preferably, the sealing member 31 also seals any gaps between the outer housing 12, inner housing 13, and the first cap 30. The first cap 30 may comprise an outer surface 32 configured to face the fluid receiving portion 3 during coupling and decoupling of the push-fit fluid coupling 1. The outer housing 12 may further comprise a projection 33 extending radially from its circumferential surface 34 and comprising an aperture (not shown) configured to receive a fastener 35, such as a screw, which engages with a similarly adapted bore, such as a threaded bore, (not shown) in the first cap 30 to fix the cap 30 to the housing 12. Other means of fastening the cap 30 to the housing 12 are also envisaged.

A second chamber 37 is defined in the first housing 4. The second chamber 37 may extend from the valve seat 8 to the sealing member 31 against which the end surface 10 of the first piston 9 is urged in the downstream direction D1. In the present embodiment, the second chamber 37 is defined by the inner housing 13. The second chamber 37 forms a fluid trap as will be described in more detail hereinafter.

The opening 6 may extend from the outer surface 32 through the first cap 30 and the sealing member 31. In the present embodiment, the opening 6 is circular and located centrally in the first cap 30 so that it is concentric with the rest of the first housing 4. In one embodiment, the sealing member 31 may be located in the opening 6. The first fluid flow path 5 extends from the inlet 15 of the outer housing 12 to the opening 6 in the outer surface 32 of the first cap 30. The first fluid flow path 5 is separated into the first and second chambers 17, 37 when the valve member 7 is on the valve seat 8. In one embodiment, the opening 6 may narrow away from the outer surface 32 of the first cap 30 so that the larger outer part guides the fluid receiving portion 3 through the opening 6 and into the second chamber 37 of the first housing 4 when the push-fit fluid coupling 1 is being coupled.

When the fluid receiving portion 3 is not received in the fluid feeding portion 2 of the push-fit fluid coupling 1, the first piston 9 is located entirely within the inner housing 13. In the present embodiment, the first piston 9 comprises a piston head 40 which is predisposed in a position in which it is located against the sealing member 31. That is, the end surface 10 of the piston head 40 of the first piston 9 faces the opening 6 and is located against the sealing member 31 to close the opening 6.

The end surface 10 may have a diameter larger than the opening 6 so that when the first piston 9 is in its downstream position it extends over and fluidly seals the opening 6 to prevent fluid exiting the fluid feeding portion 2 through the opening 6. The first piston 9 may further comprise a shaft 41 and a contact surface 42. The shaft 41 may have a smaller diameter than the piston head 40 and extend away from the end surface 10 in an upstream direction towards the valve member 7.

The overall length of the first piston 9 may be shorter than the distance between the opening 6 in the sealing member 31 and the valve seat 8. That is, the first piston 9 is shorter than the length of the inner housing 13 which defines the length of the second section 23 forming the fluid trap. Therefore, the first piston 9 is spaced from the valve member 7 when it is retained in a position in which its end surface 10 closes the opening 6 so that the first piston 9 is displaced in an upstream direction D2 towards the valve member 7 for a distance ('X' in FIG. 1) prior to making contact with the valve member 7. The distance X is at least 1 mm, preferably 4 mm.

In the embodiment shown in FIG. 1, the contact surface 42 is formed by a flange 43 which extends radially from a circumferential surface 44 of the piston head 40. In an alternative embodiment, the contact surface 42 may be formed by a rear surface of the piston head 40 from which the shaft 41 extends. The contact surface 42 provides a surface for the first spring element 11 to contact so that the first piston 9 can be urged in the downstream direction D1 into its downstream position in which the end surface 10 is located against the sealing member 31 so as to cover and close the opening 6.

The first spring element 11 is received on the first piston 9 and extends between the first piston 9 and the first housing 4 to urge the first piston 9 in the downstream direction D1 into its downstream position. More specifically, as shown in FIG. 1, the first spring element 11 extends between the contact surface 42 and a shoulder 46 of the inner housing 13 which is located upstream of the contact surface 42. The first spring element 11 may be arranged around the first piston 9 such that they are coaxially aligned.

The fluid receiving portion 3 may comprise a second housing 51 which is generally cylindrical and defines a second fluid flow path 52 therethrough. The second housing 51 may comprise two sections which may be aligned coaxially. In the present embodiment, a first section 53 of the second housing 51 is located upstream of a second section 54 which comprises an outlet 55. The first section 53 of the second housing 51 defines a fluid receiving chamber 56 and has an open upstream end 57 and a larger diameter than the diameter of the outlet 55. The outlet 55 is configured to be fluidly connected to a fluid destination (not shown), such as a water reservoir or a water recipient in a domestic appliance.

The second housing 51 of the fluid receiving portion 3 may further comprise a second cap 58 which extends around the open end 57 of the first section 53 and a sealing member 59 to seal any gaps which may exist between the first section 53 and the second cap 58. The second cap 58 may comprise an outer surface 60 configured to face the fluid feeding portion 2 during coupling and decoupling of the push-fit fluid coupling 1. The second housing 51 may further comprise a projection 61 extending radially from its circumferential surface 62 comprising an aperture (not shown) configured to receive a fastener 63, such as a screw, which engages with a similarly adapted bore, such as a threaded bore, (not shown) in the second cap 58 to close the second housing 51. Other ways of retaining the second cap 58 on the second housing 51 may be envisaged.

The fluid receiving portion 3 comprises an actuator 65 which is insertable into the opening 6 of the fluid feeding portion 2 to contact the end surface 10 of the first piston 9 and to displace the first piston 9 in the upstream direction D2. The actuator 65 may comprise an end surface 66 which is configured to engage the end surface 10 of the first piston 9 and to urge the first piston 9 away from its downstream position (i.e. against the sealing member 31) when the fluid receiving portion 3 is coupled to the fluid feeding portion 2. In the present embodiment, the actuator 65 is generally cylindrical in shape and matches the cross-section of the opening 6. The actuator 65 may extend from the outer surface 60 of the fluid receiving portion 3. That is, the actuator 65 extends from the outer surface 60 of the second cap 58. The actuator 65 may extend perpendicularly from the outer surface 60 and its base where it extends from the second cap 58 may be adapted to match the dimensions of the opening 6.

The actuator 65 comprises a fluid conduit 67 for fluid to flow from the fluid feeding portion 2 to the fluid receiving portion 3. The fluid conduit 67 is configured to allow the flow of fluid from the first fluid flow path 5 in the fluid feeding portion 2 to the second fluid flow path 52 in the fluid receiving portion 3. Therefore, the second fluid flow path 52 extends from the fluid conduit 67 to the outlet 55. The fluid conduit 67 fluidly communicates with the receiving chamber 56 in the second fluid flow path 52 when the valve member 7 has been lifted from the valve seat 8 by the first piston 9, as will described hereinafter.

Figure 4A:
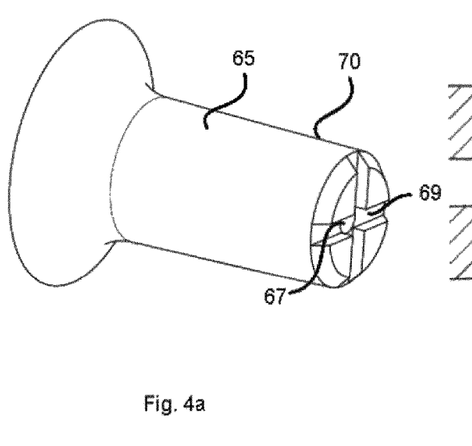
FIGS. 4a and 4b show a perspective view and a cross-sectional side elevation, respectively, of a first actuator of the fluid receiving portion according to one embodiment.
Figure 4B:
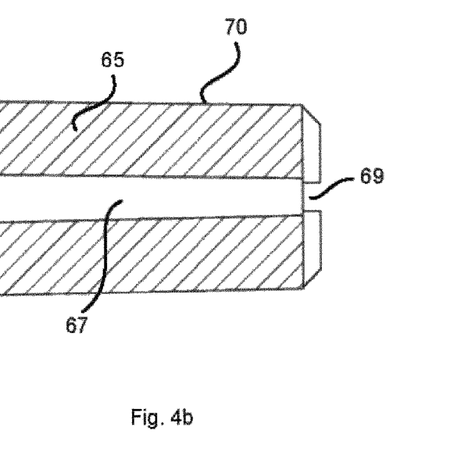

The actuator 65 shown in FIG. 1 can be viewed in perspective in FIG. 4a. A partial enlarged cross-sectional side view is also shown in FIG. 4b. The fluid conduit 67 may be a linear path extending parallel to the longitudinal axis of the actuator 65 and have a circular cross-section. The fluid conduit 67 may further comprise a channel 69 arranged at the end surface of the actuator 65 for fluid to flow from the first fluid flow path 5 into the fluid conduit 67 in the actuator 65 when the end surface 66 of the actuator 65 is in contact with the end surface 10 of the first piston 9. The channel 69 extends from the fluid conduit 67 to an outer surface 70 of the actuator 65. As shown in FIG. 4a, more than one channel 69 may be present in the end surface 66 of the actuator 65. In particular, there may be two channels that intersect each other at the entrance to the fluid conduit 67. The channels 69 allow fluid to enter the fluid conduit 67 and pass from the second chamber 37 of the first fluid flow path 5 in the fluid feeding portion 2 to the fluid receiving chamber 56 of the second fluid flow path 52 in the fluid receiving portion 3 when the end surface 66 of the actuator 65 is in contact with the end surface 10 of the first piston 9.

Figure 4C:
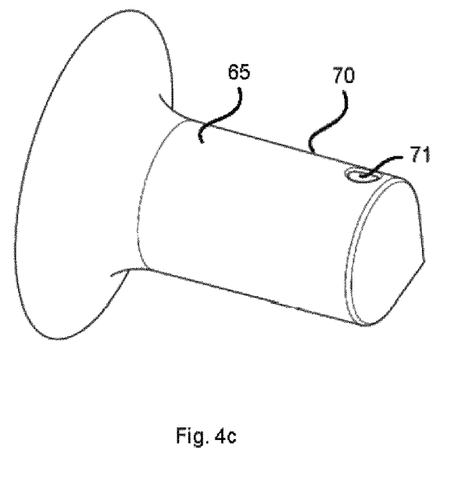
FIGS. 4c and 4d show a perspective view and a cross-sectional side elevation, respectively, of a second actuator of the fluid receiving portion according to another embodiment.
Figure 4D:
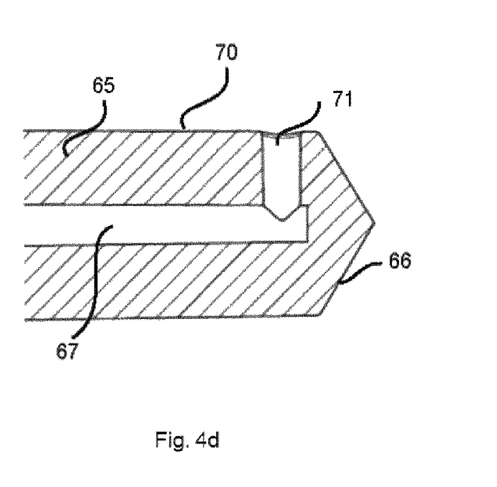

An alternative embodiment of the actuator 65 is shown in FIGS. 4c and 4d. In the alternative embodiment, the actuator 65 comprises a passage 71 extending outwardly from the fluid conduit 67 for the flow of fluid from the first fluid flow path 5 into the fluid conduit 67. The passage 71 extends from the fluid conduit 67 to an outer surface 70 of the actuator 65. The passage 71 is distant from the extremity of the surface 66 that gets in contact with the end surface 10.

The alternative embodiment of the actuator 65 may further comprise a conical end surface 66 rather than the flat end surface shown in FIGS. 4a and 4b. In one embodiment, the fluid conduit 67 may comprise a one-way valve (not shown) in an end proximate the end surface 66 of the actuator 65.

Referring back to FIG. 1, the fluid receiving portion 3 may further comprise a second piston 73 slidably received in the second fluid flow path 52. The second piston 73 may comprise a piston head 74 having an end surface 75 that faces the fluid conduit 67. The second piston 73 is predisposed in an upstream position towards the fluid conduit 67. In the present embodiment, the end surface 75 of the second piston 73 is configured to abut the second cap 58 and cover the fluid conduit 67 when in its predisposed upstream position to seal closed the second fluid flow path 52. The end surface 75 of the piston head 74 may have a larger diameter than the fluid conduit 67 so that when the second piston 73 is in its upstream position it closes the fluid conduit 67.

The second piston 73 may further comprise a seal 76 that seals against the second cap 58 to fluidly seal the second fluid flow path 52 more efficiently. The seal may be, for example, an O-ring, which extends around the piston head 74 of the second piston 73. The seal 76 may contact the piston 73 and the inner circumference of a circular protrusion 77 which extends from the internal surface of the second cap 58 into the receiving chamber 56 to enhance the fluid seal closing the second fluid flow path 52 when the second piston 73 is in its predisposed upstream position.

The second piston 73 may further comprise a shaft 78 and a contact surface 79. The shaft 78 may have a smaller diameter than the piston head 74 and extend away from the end surface 75 downstream towards the outlet 55. The contact surface 79 may be formed by a flange 80 which extends radially from the piston head 74. In an alternative embodiment, the contact surface 79 may be formed by a rear surface of the piston head 73 from which the shaft 78 extends. The contact surface 79 provides a surface for a third spring element 81 to contact the second piston 73 and urge it in the upstream direction D2 into its upstream position. The third spring element 81 retains the second piston 73 in a position in which it closes the second fluid flow path 52 in the absence of a flow of fluid in a downstream direction D1 along the fluid conduit 67. Therefore, the second piston 73 can be urged into its upstream position in which the seal 76 seals against the circular protrusion 77 to prevent the transfer of liquid.

The third spring element 81 may be received on the second piston 73 and extend between the second piston 73 and the second housing 51 to urge the second piston 73 in the upstream direction D2 into its upstream position. More specifically, as shown in FIG. 1, the third spring element 81 extends between the contact surface 79 and a piston mount 82 of the second housing 51 which is located downstream of the contact surface 79. The third spring element 81 may be arranged around the second piston 73 such that they are coaxially aligned. In the present embodiment, the piston mount 82 is located in the junction between the first and second sections 53, 54 of the second housing 51. A channel 83 (e.g. a groove) is arranged between the piston mount 82 and the second housing 51 to allow the flow of fluid along the second fluid flow path 52 towards the outlet 55.

An embodiment of the push-fit fluid coupling 1 has been described with reference to FIG. 1 in which the fluid feeding portion 2 and fluid receiving portion 3 are separated, and possibly about to be physically coupled. The method of coupling and uncoupling the fluid receiving portion 3 to the fluid feeding portion 2 will now be described with reference to FIGS. 2 and 3.

Figure 2:
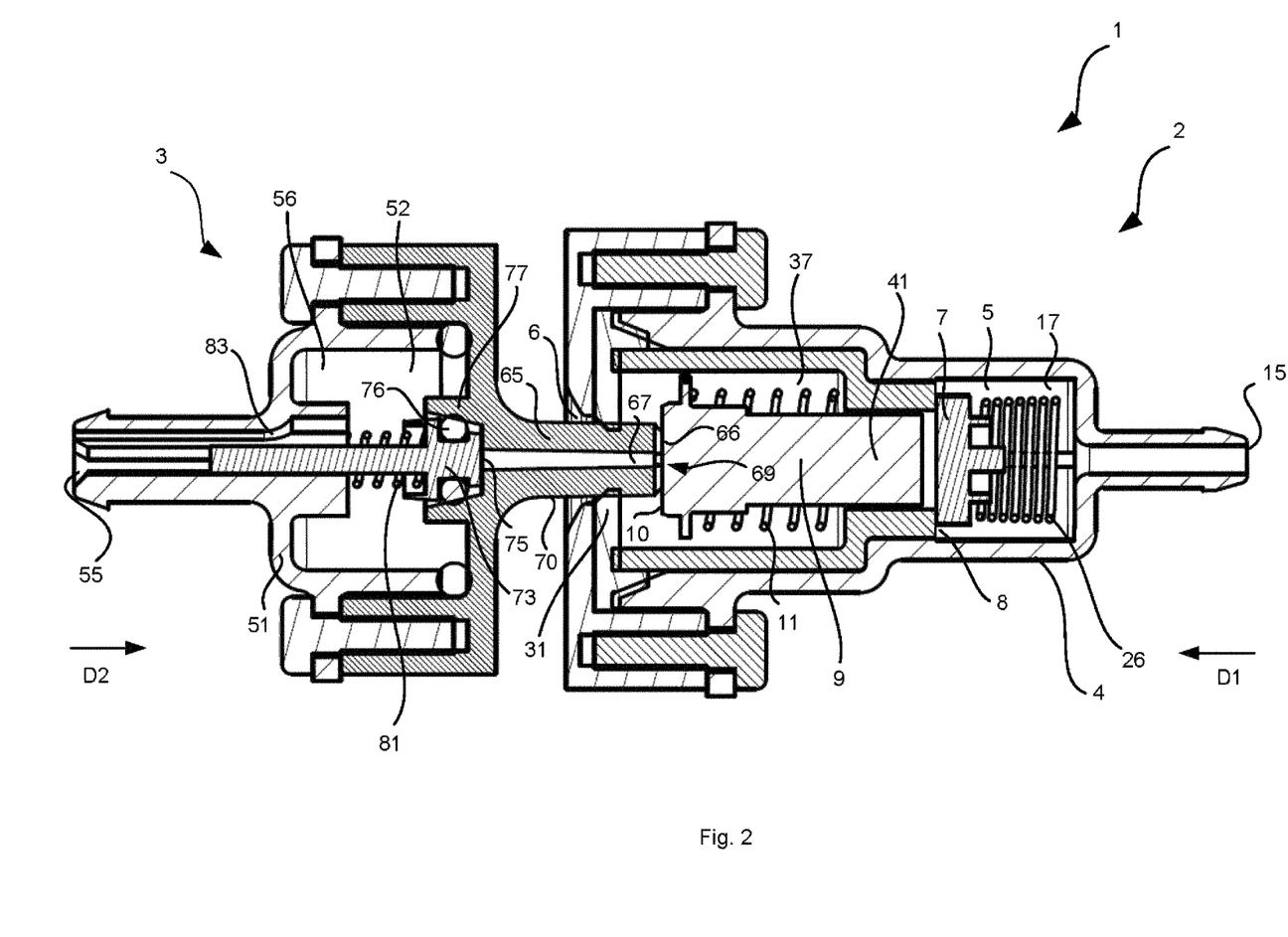
FIG. 2 shows the push-fit fluid coupling of FIG. 1, after the fluid receiving portion has been partially inserted into the fluid feeding portion.

FIG. 2 shows the fluid receiving portion 3 partially inserted into the opening 6 of the fluid feeding portion 2.

Figure 3:
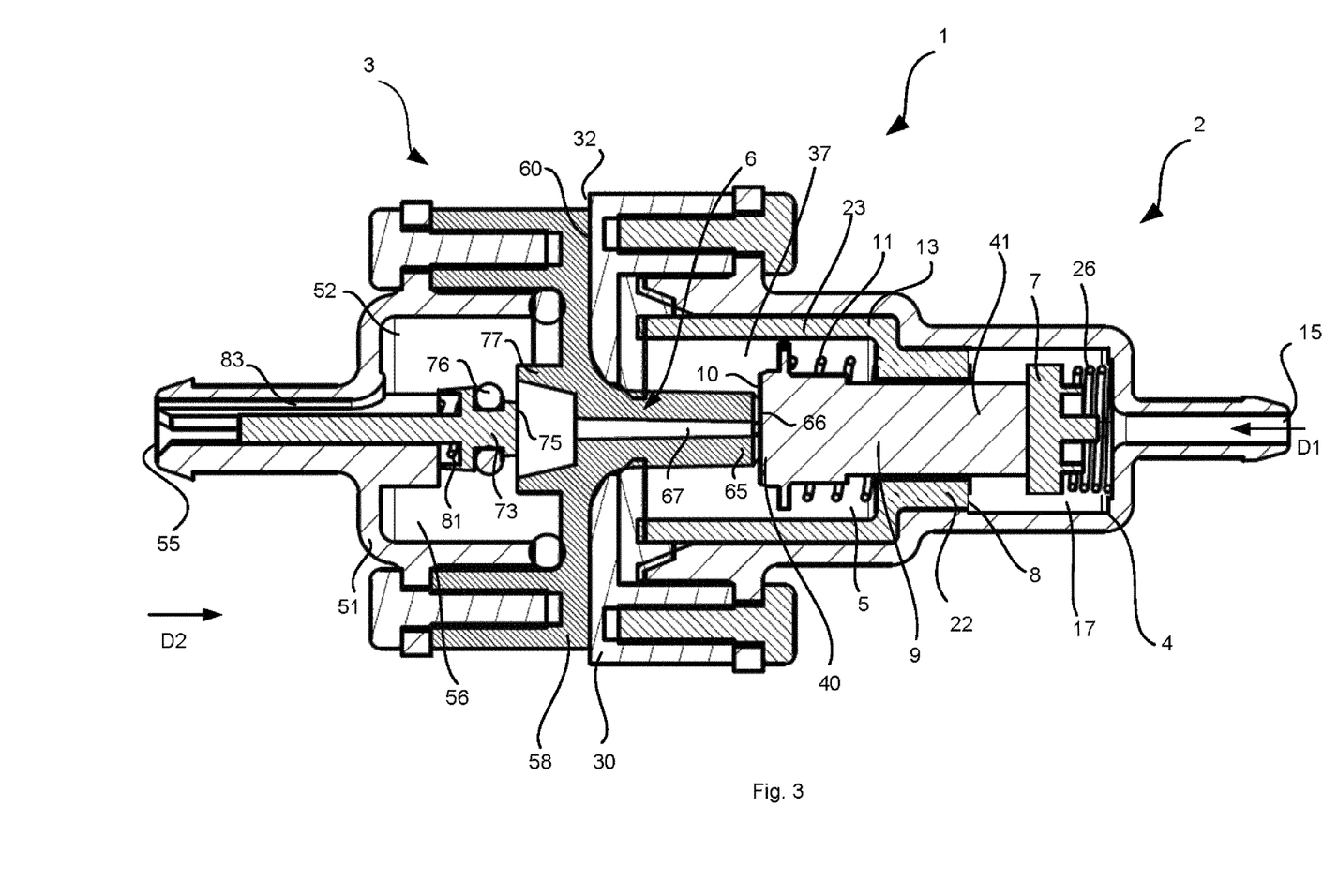
FIG. 3 shows the push-fit coupling of FIGS. 1 and 2, after the fluid receiving portion has been fully inserted into the fluid feeding portion.

FIG. 3 shows the fluid receiving portion 3 fully inserted into the opening 6 of the fluid feeding portion 2.

As shown in FIG. 1 and described in detail above, before coupling takes place, the valve member 7 is located in its downstream position on the valve seat 8 and is held in position by the second spring element 26 urging it in the downstream direction D1. The valve member 7 seals closed the open end 25 of the inner housing 13 so that the first chamber 17 and second chamber 37 are not in fluid communication. Therefore, the first fluid flow path 5 through the first housing 4 is closed.

Furthermore, the first piston 9 is located in it downstream position in which its end surface 10 extends over the opening 6 in the first cap 30 and touches the inner surface of the sealing member 31, the first piston 9 being held in position by the first spring element 11 urging it in the downstream direction D1. The first piston 9 closes the opening 6 so that the second chamber 37 is not in fluid communication with the atmosphere to prevent the leakage of fluid from the second chamber 37. Therefore, the first fluid flow path 5 through the first housing 4 is closed at two points. The first piston 9 is also located completely within the inner housing 13. Therefore, the first piston 9 is spaced from the valve member 7.

Referring to FIG. 2, the fluid receiving portion 3 is (partially) inserted into the fluid feeding portion 2 in order to physically couple the push-fit fluid coupling 1. To physically couple the push-fit fluid coupling 1, the end surface 66 of the actuator 65 is inserted into the opening 6 in the first cap 30. As the actuator 65 is inserted further into the fluid feeding portion 2, the actuator 65 engages into the sealing member 31. The sealing member 31 seals against the outer surface 70 of the actuator 65. The end surface 66 then contacts the end surface 10 of the first piston 9.

As the fluid receiving portion 3 is inserted further into the fluid feeding portion 2, the end surface 66 of the actuator 65 urges the first piston 9 in an upstream direction D2, against the force of the first spring element 11, towards the valve member 7. As the actuator 65 is further inserted in the upstream direction D2, more of the actuator 65 enters the second chamber 37 and the volume that can be occupied by fluid decreases. This decrease in volume may cause the fluid level in the second chamber 37 to rise and fluid to enter the fluid conduit 67 through the channels 69, or passage 71, shown in FIGS. 4c and 4d, in an alternative embodiment. When the fluid completely fills the volume between the valve member 7 and the second piston 73 and the fluid pressure becomes too high, one of the valve member 7 or second piston 73, preferably the second piston 73, may be configured to move from its predisposed position to relieve the pressure.

Eventually, the actuator 65 will have been inserted into the fluid feeding portion 2 by a sufficient distance that it has displaced the first piston 9 into contact with the valve member 7. Once the actuator 65 is inserted further than this, the first piston 9 urges the valve member 7 in the upstream direction D2 against the force of the second spring element 26, and any fluid pressure, and lifts the valve member 7 off the valve seat 8 to completely open the first fluid flow path 5 through the first housing 4, as further shown in FIG. 3.

With the first fluid flow path 5 open, fluid is able to flow from in the downstream direction D1 from the inlet 15 through the first chamber 17, past the valve seat 8 into the second chamber 37 where the fluid flows along the fluid conduit 67 in the actuator 65. At this point the fluid comes into contact with the end surface 75 of the second piston 73 which is still held in its upstream position in which the seal 76 abuts the circular protrusion 77, and the end surface 75 is against or proximate to the fluid conduit 67, thanks to the third spring element 81, to seal the second fluid flow path 52 closed. The upstream position of the second piston 73 is shown in FIG. 2 before the valve member 7 has been lifted off the valve seat 8. The pressure of the fluid flowing through the fluid conduit 67 builds up and acts against the end surface 75 of the second piston 73. When the pressure of the fluid flow overcomes the spring force of the third spring element 81, the second piston 73 slides in the downstream direction D1 and fluid can flow along the second fluid flow path 52 in the downstream direction D1, through the fluid receiving chamber 56 and channels 83 to the outlet 55 of the second housing 51.

Fluid is able to flow past the first piston 9 because its shaft 41 has a smaller diameter than the diameter of the first section 22 of the inner housing 13, and the piston head 40 has a smaller diameter than the second section 23 of the inner housing 13.

It is at this point, when the fluid receiving portion 3 is inserted far enough into the fluid feeding portion 2 to cause a flow of fluid from the inlet 15 to the outlet 55 of the second housing 51, the push-fit fluid coupling 1 is functionally coupled, as shown in FIG. 3.

In the present embodiment, the end surface 60 of the fluid receiving portion 3 contacts the end surface 32 of the fluid feeding portion 2 when the actuator 65 is fully inserted into the opening 6. In this position, both the valve member 7 and first piston 9 have been maximally displaced.

During decoupling of the push-fit fluid coupling 1, the fluid receiving portion 3 is withdrawn from the fluid feeding portion 2. That is, the fluid receiving portion 3 is moved in the downstream direction D1.

As the actuator 65 is removed from the fluid feeding portion 2, the first spring element 11 urges the first piston 9 in the downstream direction D1 back towards its downstream position such that the end surface 10 of the first piston 9 remains in contact with the end surface 66 of the actuator 65.

Likewise, the second spring element 26, and any flow pressure, urges the valve member 7 in the downstream direction D1 back towards its downstream position such that the downstream surface of the valve member 7 remains in contact with the shaft 41 of the first piston 9 until the actuator 65 has been withdrawn to such an extent that the valve member 7 is urged against the valve seat 8 to close the first fluid flow path 5 through the first housing 4, as shown in FIG. 2.

The closing of the first fluid flow path 5 by the valve member 7 on the valve seat 8 means that fluid is held in the first chamber 17, and pressure from the fluid source is prevented from being transferred downstream beyond the valve member 7. Therefore, there is no longer a fluid flow through the fluid conduit 67 in the actuator 65 to keep the second piston 73 in its downstream position. As a result of the first fluid flow path 5 being closed, the second fluid flow path 52 is closed by the third spring element 81 urging the end surface 75 of the second piston 73 in the upstream direction D2 against the fluid conduit 67 and the sealing member 76 against the circular protrusion 77, as shown in FIG. 2. This is because the second fluid flow path 52 can only be opened by fluid pressure and results in fluid being trapped in the second chamber 37 in the fluid feeding portion 2 and in the fluid conduit 67 in the fluid receiving portion 3.

It will be understood that the position of the second piston 73 may depend upon whether the valve member 7 is seated on the valve seat 8 or not, i.e. whether there is any fluid pressure.

In another embodiment, the second piston 73 may seal the fluid conduit 67 if the fluid flow pressure falls below a predetermined minimum.

In the present embodiment, during coupling of the push-fit fluid coupling, the valve member 7 is always first moved before the second piston 73.

As the actuator 65 is withdrawn further from the fluid feeding portion 2, less of the volume of the second chamber 37 is taken up by the actuator 65 and so the volume that can be filled by the fluid increases so the fluid level in the second chamber 37 decreases.

In one embodiment, fluid in the fluid conduit 67 may be drawn into the second chamber 37 due to a negative pressure generated in the second chamber 37 during the removal of the fluid receiving portion 3.

Eventually, the fluid receiving portion 3 is completely removed from the fluid feeding portion 2, as shown in FIG. 1. When this happens, the end surface 10 of the first piston 9 is urged back into its downstream position against the sealing member 31 over the opening 6 by the first spring element 11 to close the opening 6 and thereby prevent fluid exiting the first housing 4, as shown in FIG. 1. Therefore, fluid is trapped in the second chamber 37 of the fluid feeding portion to prevent leaks of fluid. Furthermore, the sealing member 31 acts against the outer surface 70 of the actuator 65 as the fluid receiving portion 3 is withdrawn from the opening 6 to scrape fluid from the surface 70 and retain the fluid in the second chamber 37 of the fluid feeding portion 2.

Fluid that remains in the fluid conduit 67 of the actuator 65 during the uncoupling process is held in the fluid conduit 67 by a combination of surface tension and atmospheric pressure applied on it. Thus, fluid leaking from the fluid conduit 67 is prevented.

The embodiment of the fluid conduit 67 used depends on the requirements of the push-fit fluid coupling 1.

If the highest priority is considered to be the ease of manufacture, then the embodiment of the actuator 65 shown in FIGS. 4a and 4b with the channels 69 is preferred.

However, if the highest priority is considered to be the water retaining capability of the fluid conduit 67, then the embodiment of the actuator 65 shown in FIGS. 4c and 4d with the passage 71 is preferred. In particular, the passage 71 may face vertically upwards so that it is more difficult for fluid to escape the fluid conduit 67 against the effects of gravity.

The invention relates to a system comprising:
a docking station comprising a water supply,
a domestic appliance mountable on the docking station, and
the push-fit fluid coupling 1 as explained above, to enable water to flow from the water supply into the domestic appliance when the domestic appliance is mounted on the docking station.

For example, the domestic appliance is chosen among the set of appliances defined by steam iron (further detailed by FIG. 5), cordless steam iron, garment steamer, cordless garment steamer, kitchen appliance (such as kettle, coffee machine).

Figure 5:
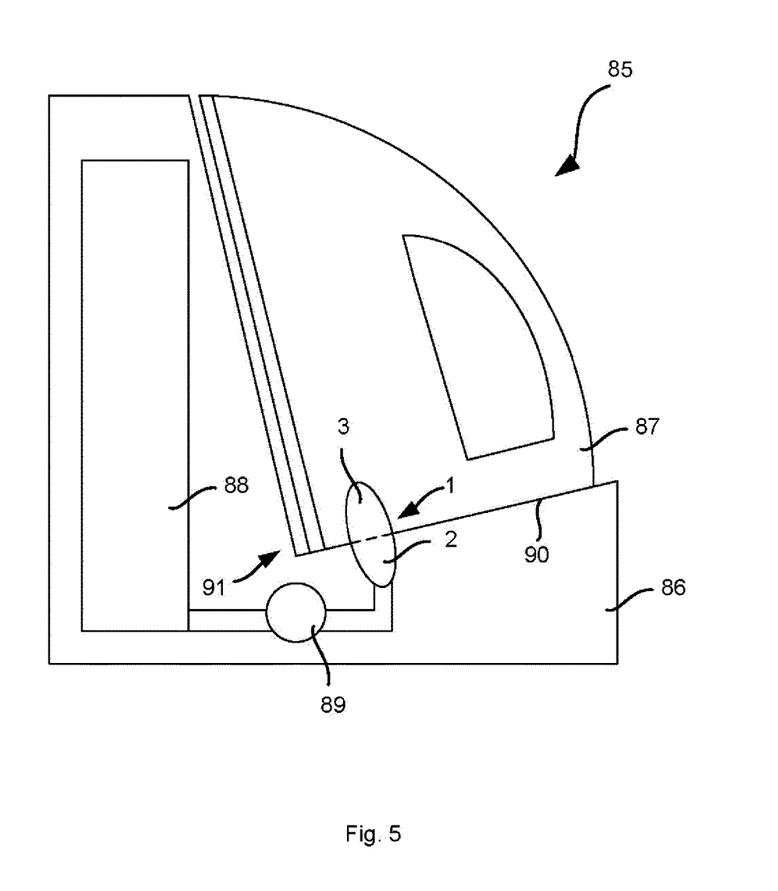
FIG. 5 shows a steam ironing system comprising the push-fit fluid coupling shown in FIGS. 1 to 3.

Referring now to FIG. 5, a steam ironing system 85 having the push-fit fluid coupling 1, as shown in FIGS. 1 to 3, is shown.

The steam ironing system 85 comprises a docking station 86 and a steam iron 87 mountable on the docking station 86. The steam iron 87 may be a cordless steam iron or may have a cord linking with the docking station 86. The docking station 86 may comprise a water supply, such as a fluid reservoir 88 for storing fluid (e.g. water), and a pump 89 for transferring fluid from the fluid reservoir 88 to the steam iron 87 via the push-fit fluid coupling 1 when the steam iron 87 is mounted with the docking station 86.

Preferably, the fluid feeding portion 2 may be arranged on the docking station 86 and the fluid receiving portion 3 may be arranged on the steam iron 87. Furthermore, the fluid receiving portion 3 may be arranged near a heel 91 of the steam iron 87 and the docking station 86 may comprise a docking surface 90 for the steam iron 87 to be placed on. The docking surface 90 may be inclined and the fluid feeding portion 2 may be located at the lower end of the incline. Therefore, the heel 91 of the steam iron 87 comprising the fluid receiving portion 3 can be placed at the lower end of the docking surface 90 so that the push-fit fluid coupling 1 can be held together by gravity, the weight of the steam iron 87, or by friction between the steam iron 87 and the docking surface 90. Alternatively, the fluid receiving portion 3 may be arranged on the docking station 86 and the fluid feeding portion 2 may be arranged on the steam iron 87.

In an alternative embodiment, the steam ironing system 85 may further comprise a lock (not shown) to hold the push-fit fluid coupling 1 together during the transfer of fluid.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. A system comprising:
a docking station that includes a water supply,
a domestic appliance mountable on the docking station, and
a push-fit fluid coupling to enable water to flow from the water supply into the domestic appliance in response to the domestic appliance being mounted on the docking station,
wherein the push-fit fluid coupling comprises a fluid feeding portion and a fluid receiving portion adapted to cooperate with each other to enable fluid to flow in a downstream direction (D1) from the fluid feeding portion to the fluid receiving portion,
wherein the fluid receiving portion comprises an actuator that includes an outer surface and an end surface, and a fluid conduit disposed within the actuator (i) for fluid to flow from the fluid feeding portion to the fluid receiving portion in response to the fluid conduit being open to fluid flow and (ii) for fluid not to flow in response to the fluid conduit being closed to fluid flow,
wherein the fluid feeding portion comprises a housing that defines a fluid flow path and includes an opening in which the actuator is intended to be inserted, a chamber arranged in the housing in which fluid is intended to flow, a valve seat and a valve member engaging the valve seat for closing the fluid flow path, and a first piston slidably received in the chamber downstream of the valve member,
wherein the fluid feeding portion and the fluid receiving portion are adapted to cooperate with each other such that:
a) responsive to the actuator being inserted into the opening, the outer surface of the actuator and the opening cooperate with each other to form a fluid seal preventing fluid in chamber of the fluid feeding portion to leak out from the chamber, wherein the fluid conduit of the actuator remains closed to fluid flow, and
b) responsive to the actuator being further inserted into the opening, an end surface of the actuator contacts an first end surface of the first piston to displace the first piston in an upstream direction (D2) until an opposite end surface of the first piston contacts the valve member and lifts the valve member off the valve seat for opening the fluid flow path within the fluid feeding portion and allowing fluid to flow in said downstream direction (D1) to the fluid receiving portion, wherein responsive to fluid flow to the fluid receiving portion via the fluid flow path within the fluid feeding portion, the fluid conduit of the actuator is opened to fluid flow.

2. A system according to claim 1, wherein the push-fit fluid coupling further comprises a first spring element cooperating with the first piston so as to retain the first piston in a downstream position in which the first piston closes the opening when the actuator is not inserted into the opening.

3. A system according to claim 2, wherein the first spring element is a coil spring.

4. A system according to claim 1, wherein the push-fit fluid coupling comprises a second spring element acting on the valve member to retain the valve member in engagement with said valve seat for closing the fluid flow path.

5. A system according to claim 1, wherein the first piston is spaced from the valve member when the first piston is retained in said downstream position in which the first piston closes the opening, so that the first piston is displaced in an upstream direction (D2) towards the valve member for a given distance (X) prior to making contact with the valve member.

6. A system according to claim 1, comprising a sealing member extending about the opening to form a fluid seal between the actuator and the opening.

7. A system according to claim 1, wherein the first piston and the valve member are both maintained in a downstream position when the actuator is not inserted into the opening.

8. A system comprising:
a docking station comprising a water supply,
a domestic appliance mountable on the docking station, and
a push-fit fluid coupling to enable water to flow from the water supply into the domestic appliance when the domestic appliance is mounted on the docking station,
wherein the push-fit fluid coupling comprises a fluid feeding portion and a fluid receiving portion adapted to cooperate with each other to enable fluid to flow in a downstream direction (D1) from the fluid feeding portion to the fluid receiving portion, the fluid receiving portion comprising an actuator comprising a fluid conduit for fluid to flow from the fluid feeding portion to the fluid receiving portion, the fluid feeding portion comprising a housing defining a fluid flow path and comprising an opening in which the actuator is intended to be inserted, a chamber arranged in the housing in which fluid is intended to flow, a valve seat and a valve member engaging the valve seat for closing the fluid flow path, a first piston slidably received in the chamber downstream of the valve member, wherein the fluid feeding portion and the fluid receiving portion are adapted to cooperate with each other such that:

a) when the actuator is inserted in the opening, the actuator and the opening cooperate with each other to form a fluid seal preventing fluid in chamber to leak out from the chamber, then b) when the actuator is further inserted in the opening, the actuator is adapted to contact the first piston and to displace the first piston in an upstream direction (D2) until the first piston contacts the valve member and lifts the valve member off the valve seat for opening the fluid flow path and allowing fluid to flow in said downstream direction (D1), wherein the fluid receiving portion of the push-fit coupling comprises a housing, a fluid flow path extending through the housing, a second piston being slidably received in said fluid flow path and retained in a position in which the second piston closes the fluid flow path in the absence of a flow of fluid in a downstream direction (D1) along the fluid conduit.

9. A system according to claim 8, wherein the second piston comprises a seal to form a fluid seal between the second piston and the housing to close the fluid flow path.

10. A system according to claim 1, wherein the actuator extends from a surface of the fluid receiving portion, and the opening is formed in a surface of the fluid feeding portion, the surface of the fluid receiving portion and the surface of the fluid feeding portion being adapted to contact with each other when the actuator is inserted into the opening.

11. A system according to claim 1, wherein the actuator has an end surface comprising a channel for fluid to flow from the fluid flow path into the fluid conduit.

12. A system according to claim 1, wherein the actuator comprises a passage extending outwardly from the fluid conduit for the flow of fluid from the fluid flow path into the fluid conduit.

13. A system according to claim 1, wherein the fluid feeding portion is arranged in the docking station and the fluid receiving portion is arranged in the domestic appliance.

14. A system according to claim 13, wherein the domestic appliance is chosen among a set of appliances defined by steam iron, cordless steam iron, garment steamer, cordless garment steamer, and kitchen appliance.

15. A system according to claim 1, wherein the fluid receiving portion of the push-fit coupling comprises a housing, a fluid flow path extending through the housing, a second piston being slidably received in said fluid flow path and retained in a position in which the second piston closes the fluid flow path in the absence of a flow of fluid in a downstream direction (D1) along the fluid conduit.

16. A system according to claim 15, wherein the second piston comprises a seal to form a fluid seal between the second piston and the housing to close the fluid flow path.

* * * * *